US010711599B2

(12) United States Patent
Jaaskelainen et al.

(10) Patent No.: US 10,711,599 B2
(45) Date of Patent: Jul. 14, 2020

(54) ELECTROACOUSTIC PUMP-DOWN SENSOR

(71) Applicant: Halliburton Energy Services, Inc., Houston, TX (US)

(72) Inventors: Mikko Jaaskelainen, Katy, TX (US); Brian Vandellyn Park, Spring, TX (US); Norman R. Warpinski, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 223 days.

(21) Appl. No.: 15/775,807

(22) PCT Filed: Dec. 16, 2015

(86) PCT No.: PCT/US2015/066088
§ 371 (c)(1),
(2) Date: May 11, 2018

(87) PCT Pub. No.: WO2017/105435
PCT Pub. Date: Jun. 22, 2017

(65) Prior Publication Data
US 2018/0328170 A1    Nov. 15, 2018

(51) Int. Cl.
*G01H 9/00*     (2006.01)
*E21B 47/135*   (2012.01)
(Continued)

(52) U.S. Cl.
CPC ............ *E21B 47/135* (2020.05); *E21B 23/10* (2013.01); *E21B 47/07* (2020.05); *G01H 9/004* (2013.01)

(58) Field of Classification Search
CPC ...... E21B 47/123; E21B 47/065; E21B 47/14; E21B 47/16; E21B 47/00; E21B 47/02; E21B 23/10; E21B 23/08; E21B 23/04; E21B 49/00; E21B 7/04; G01H 9/004; G01F 1/661; G01F 25/007; G02B 6/00; G01N 21/47; G01J 3/00; G01J 3/02;
(Continued)

(56) References Cited

U.S. PATENT DOCUMENTS

| 7,172,038 | B2 * | 2/2007 | Terry | ....................... G01V 3/30 |
| | | | | 175/45 |
| 2008/0316866 | A1 * | 12/2008 | Goodemote | ......... G10K 11/008 |
| | | | | 367/151 |

(Continued)

OTHER PUBLICATIONS

International Search Report and Written Opinion of PCT Application No. PCT/US2015/066088 dated Sep. 7, 2016: pp. 1-12.

*Primary Examiner* — Harshad R Patel
*Assistant Examiner* — Nigel H Plumb
(74) *Attorney, Agent, or Firm* — Chamberlain Hrdlicka

(57) ABSTRACT

Disclosed are pump-down sensor devices that operate in conjunction with a fiber-optic sensing system to take downhole measurements and communicate them to the surface while moving untethered through a borehole. A pump-down sensor device in accordance with various embodiments includes one or more flow baffles configured for a specified buoyancy, and an electronics module for measuring one or more downhole parameters and transmitting an acoustic signal encoding the measured parameter(s). The acoustic signal can be detected using the fiber-optic sensing system. Additional embodiments are disclosed.

22 Claims, 6 Drawing Sheets

(51) Int. Cl.
*E21B 47/07* (2012.01)
*E21B 23/10* (2006.01)

(58) Field of Classification Search
CPC .. G01B 9/02; G01B 9/02044; G01B 9/02004; G01B 11/14; G01C 19/72; G01C 19/721; G01C 19/722; G01C 19/727
See application file for complete search history.

(56) References Cited

U.S. PATENT DOCUMENTS

| | | | |
|---|---|---|---|
| 2011/0253373 A1* | 10/2011 | Kumar | E21B 21/00 166/306 |
| 2012/0013893 A1* | 1/2012 | Maida | E21B 47/123 356/73.1 |
| 2012/0111104 A1* | 5/2012 | Taverner | G01H 9/004 73/152.16 |
| 2013/0298635 A1* | 11/2013 | Godfrey | G01F 1/66 73/1.16 |
| 2014/0126332 A1* | 5/2014 | Skinner | E21B 47/101 367/82 |
| 2014/0150523 A1* | 6/2014 | Stokely | E21B 47/123 73/1.82 |
| 2014/0158350 A1* | 6/2014 | Castillo | E21B 23/10 166/250.17 |
| 2017/0299758 A1* | 10/2017 | Pelletier | G01V 1/22 |

\* cited by examiner

ELECTROACOUSTIC PUMP-DOWN SENSOR

BACKGROUND

In oil and gas field operations, downhole measurements of various physical, chemical, and other parameters are routinely taken to monitor completion, stimulation, and production processes. Many conventional downhole sensors are either deployed permanently on casing in the annular space around the borehole casing or on tubing in the annular space inside the casing, or temporarily using retrievable means of conveyance such as wireline, slickline, or coiled tubing. Wireline logging and similar methods that employ retrievable sensor devices are useful to measure borehole and formation properties in between various completion, stimulation, and production processes, but would interfere with many of these processes (e.g., fracking) if used simultaneously therewith, which severely limits their utility for monitoring these processes in real time. Permanently installed sensors are not subject to this limitation, but pose other challenges. Permanently installed sensors may communicate with the surface via electrical, hydraulic, or optical fiber cables, or using some other transmission method, like low-speed communication with pressure pulses. They are commonly deployed on eccentric mechanical mandrels, and have an outer diameter (OD) that may be in the range between 0.75" and 1.5", and the sensors are commonly deployed on mechanical mandrels that are eccentric. This tends to require a larger clearance between the casing and the formation for casing-deployed single or multi-point sensors, or similarly a larger clearance between the tubing and casing for tubing-deployed single point or multi-point sensors. Since the cost of drilling a well is closely related to the size of the well, it may be desirable to minimize the size of the annular clearance needed. Optical fiber cables, which have a smaller outer diameter (e.g., between ⅛" and ¼") and therefore a smaller foot print than point sensors outside the casing, provide a beneficial alternative for certain types of measurements, such as temperature and acoustic measurements using distributed temperature sensing or distributed acoustic sensing techniques. However, the number and types of parameters that can be monitored directly with distributed optical fibers are limited. Accordingly, there is a need for alternative sensing systems and techniques, in particular, for means of measuring multiple downhole parameters and communicating them in real time to the surface while minimizing the size of the borehole to be drilled.

DETAILED DESCRIPTION

This disclosure relates to pump-down sensor devices that operate in conjunction with a distributed or quasi-distributed fiber-optic sensing system to take downhole measurements and communicate them to the surface while moving untethered through a borehole. The sensor devices are pumped downhole through a pipe disposed in the borehole (e.g., the borehole casing, or a tubing interior to the casing) with a pumping fluid. Beneficially, this facilitates deploying the sensor devices on demand, and avoids increases to the borehole diameter beyond that needed to install an optical fiber cable behind the casing.

In accordance with various embodiments, the pump-down sensor device includes one or more sensors to measure one or more downhole parameters, and an electro-acoustic transmitter (e.g., a piezoelectric transducer) that converts an electronic signal encoding the measured parameter(s) into an acoustic signal encoding the measured parameter(s). The acoustic signal is transmitted to and picked up by an optical fiber that can be interrogated from the surface. The pump-down sensor device further includes one or more flow baffles, e.g., made of syntactic foam, that are configured for a specified buoyancy of the sensor device relative to its weight. For example, in one embodiment, the sensor device is neutrally buoyant in a given pumping fluid such that it remains stationary in the absence of flow. Such neutrally buoyant devices can be pumped down to a desired borehole location to continuously take and transmit measurements thereat after pumping ceases, and can subsequently be retrieved from the borehole by reversing the pumping direction. In another embodiment, the sensor device is positively buoyant such that it is passively returned to the surface when pumping stops, taking and transmitting measurements along the way. In yet another embodiment, the sensor device is negatively buoyant such that it sinks to the bottom of the borehole.

Various example embodiments will now be described in more detail with reference to the accompanying drawings.

Figure 1:
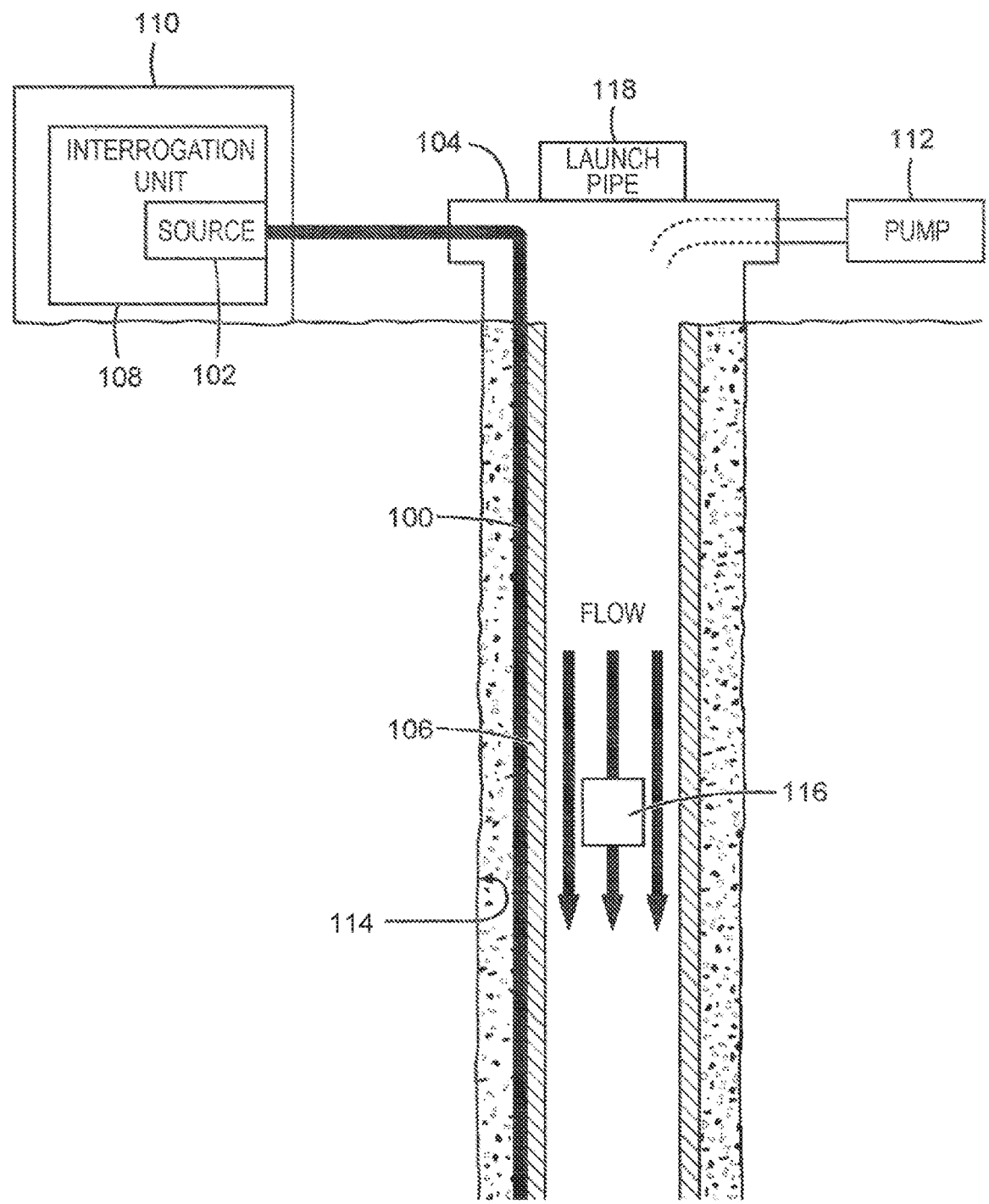
FIG. 1 is a diagram of an example fiber-optic sensing system and pump-down sensor device deployed in a borehole environment, in accordance with various embodiments.

FIG. 1 is a diagram of an example fiber-optic sensing system and pump-down sensor device deployed in a borehole environment, in accordance with various embodiments. A fiber cable 100 including one or more optical fibers enclosed, e.g., in stainless steel tubing is run at the surface from a laser source 102 to the wellhead 104, and from there downhole in the annular space surrounding the borehole casing 106. The fiber cable 100 may haven an outer diameter between about an eighth of an inch and a quarter of an inch, and may be clamped, banded, welded, or otherwise coupled to the exterior surface of the borehole casing 106 such that deployment of the fiber cable 100 increases the requisite borehole diameter only minimally, if at all. Alternatively, in embodiments where additional tubing (not shown) is disposed interior to the casing 106, e.g., for hydrocarbon production, the fiber cable 100 may be affixed to the exterior of such additional (e.g., production) tubing. The optical fiber(s) within the fiber cable 100 may act as a distributed or quasi-distributed sensor, allowing measurements to be located along the cable continuously or at least with very high spatial resolution. In particular, the fiber cable 100 may be used for acoustic or vibration-based sensing, in which optical-path-length and/or refractive-index changes due to acoustic/vibration energy impacting the optical fiber(s) are detected optically. (Hereinafter, the terms "acoustic" and "vibration-based" are used synonymously. In particular, the term "acoustic" is not meant to limit embodiments to the audible frequency range.)

Distributed acoustic/vibration sensing (DAS) may be based on coherent Rayleigh backscattering, where the optical fiber acts as a distributed interferometer for light pulses coupled from the light source 102 into the fiber, resulting in intensity and/or phase variations in the backscattered optical response signal received at the surface that are indicative of local optical-path-length changes due to, e.g., local acoustic or vibrational perturbations of the fiber. Since light scattered at deeper locations within the borehole will occur at later times within the response signal, due to the longer distance traveled, the detected acoustic or vibrational perturbations can be correlated with a certain position along the fiber and, thus, a certain depth within the borehole. Alternatively to using the optical fiber itself as an interferometer, Fabry-Perot sensors formed by partially reflective elements like Fiber Bragg Gratings (FBGs), or Sagnac, Michelson, Mach-Zehnder, or other types of interferometers may be distributed throughout the optical fiber for quasi-distributed sensing. Point FBG sensors located in the optical fiber at various known points along the borehole to facilitate direct wavelength detection are yet another option for quasi-distributed sensing. In either case, the optical response signals may be collected and analyzed at the surface by an interrogation unit 108 (e.g., a DAS unit), which may be housed together with the laser source 102 in a common enclosure 110. The interrogation unit 108 may include a detector device to measure the optical response signals and a computational facility to process the measured response signals. The computational facility may be implemented using a general-purpose or special-purpose processor and/or other circuitry (e.g., a microprocessor and associated memory storing processor-executable instructions, a digital signal processor, a field-programmable gate array, etc.), and may further include user-interface hardware, e.g., a display device for displaying the optical signal and information obtained therefrom. DAS and other fiber-optic sensing systems including a fiber cable 100, laser source 102, and interrogation unit 108 are generally well-known to those of ordinary skill in the art.

A pump 112 located above surface may pump a fluid through a pipe disposed in the borehole. Depending on the stage of the borehole and the particular operation, this pipe may be the borehole casing 106 or tubing disposed interior to the casing 106. For example, during borehole completion, cement slurry may be pumped down the interior of the casing 106 and back up through the annulus between the casing 106 and the borehole wall 114, where it solidifies. A plug may be pumped at the end of the cementing process, and this plug may be instrumented with an electro-acoustic transmitter to periodically communicate its location along the wellbore, via acoustic signals detected by the distributed acoustic sensing system, as the cement is being pumped in. The plug may also have a pressure/temperature sensor to allow for pressure and temperature measurements during cement cure. Similarly to the process of cementing the casing, cement may be pumped downhole and squeezed into a problematic void space adjacent the borehole during remedial cementing (also "squeeze cementing"). Further, to stimulate hydrocarbon production and clean out any debris that may have clogged the formation during preceding drilling and completion operations, a diluted acid can be pumped downhole. High-pressure fluids may be pumped into the borehole for hydraulic fracturing operations. During production, hydrocarbons are pumped out of the borehole via production tubing disposed inside the cased borehole. In all these and other situations, it may be desirable to monitor physical parameters such as pressure, temperature, and/or flow velocities downhole.

In various embodiments, downhole measurements are facilitated by one or more untethered sensor devices 116 that are disposed in the pipe (casing 106 or additional tubing) and move with the respective pumping fluid (e.g., water, acid, or chemical solutions, cement slurry, etc.), allowing the sensor device(s) 116 to be deployed on demand. In various embodiments, the sensor devices 116 can be deployed in the borehole via a launch pipe 118 mounted on top of the wellhead 104 (e.g., bolted to the wellhead 104), in a manner similar to that conventionally used to launch "pigs" (devices used to perform pipeline maintenance operations such as cleaning) into pipelines. The sensor devices convert the measurements (e.g., electroacoustically) into acoustic signals (imparted on acoustic waves) encoding the measured parameter(s). The acoustic waves are transmitted to the optical fiber(s), whose refractive index and/or optical path length per fiber section are locally perturbed as a result. These perturbations can be detected in the optical signal received at the surface and decoded to determine the measure parameter(s) and/or location of the sensor device. For measurements during a production operation or some other operation that involves an additional tubing inside the cased borehole, the sensor device 116 is pumped through this additional tubing. In this case, the optical cable 100 may be mounted directly on the exterior surface of the tubing, interior to the borehole casing 106. Alternatively, the acoustic signal may be transmitted to an optical cable 100 placed on the outside of the borehole casing 106 through the (production) tubing, material in the annular space between tubing and casing 106, and the casing 106.

Figure 2:
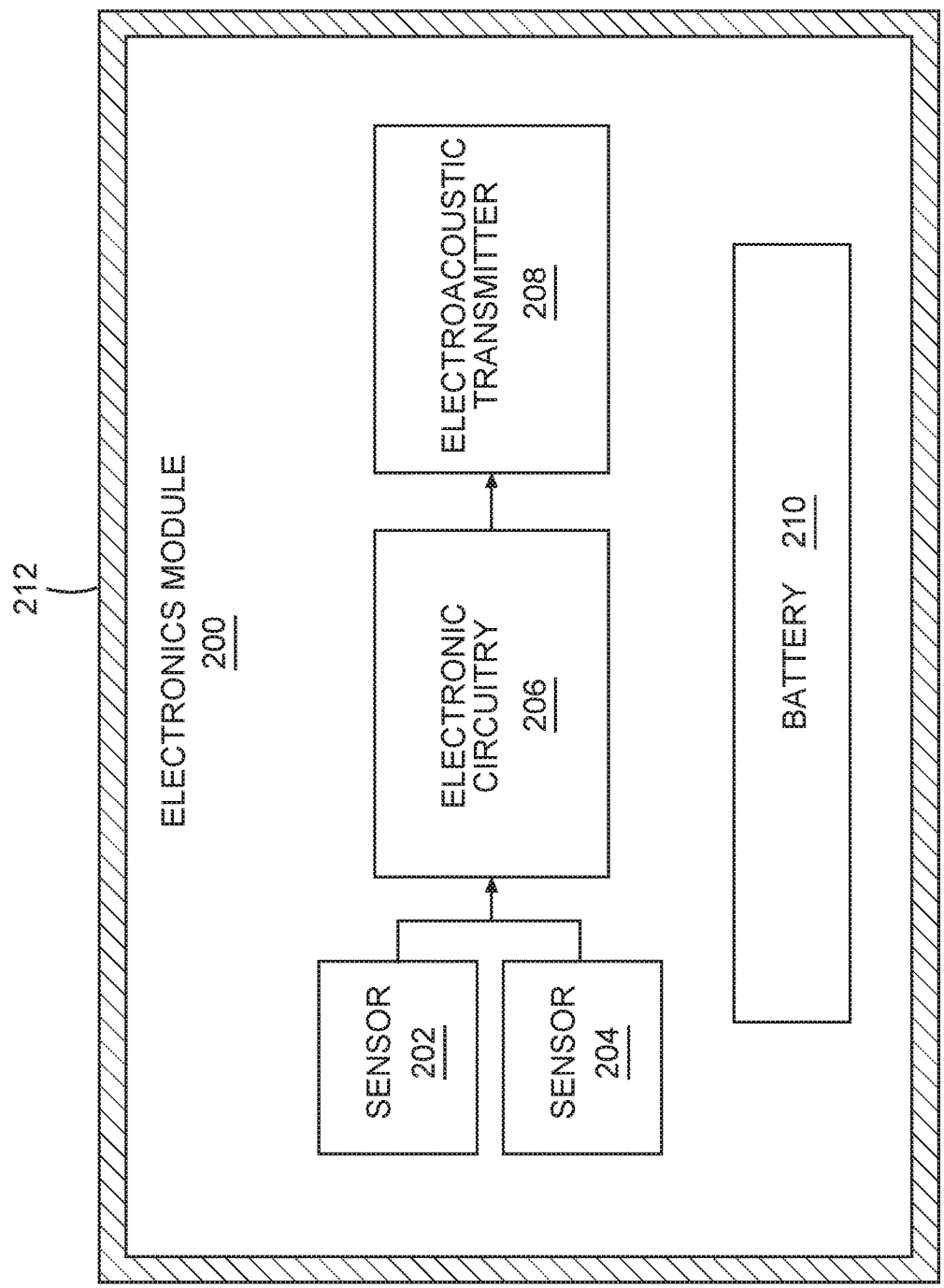
FIG. 2 is a schematic diagram illustrating an example electronics module of a pump-down sensor device in accordance with various embodiments.

FIG. 2 is a schematic diagram illustrating an example electronics module 200 providing the measurement and electroacoustic transmission functionality of the pump-down sensor device 116. The electronics module 200 includes one or more sensors 202, 204 for measuring one or more downhole parameters, such as, for example and without limitation, pressure, temperature, flow parameters, resistivity, chemical parameters, acoustic parameters, seismic parameters, and/or directional acoustic or seismic parameters. (While two sensors 202, 204 are shown, it should be understood that the sensor device 116 may include any number of one or more sensors.) Electronic circuitry 206 may serve to encode the measured parameter(s) in a digital or analog electronic signal suitable for transmission via one or more electroacoustic transmitters 208. Alternatively, in certain embodiments, the sensor output itself serves as the electronic signal, which may obviate the need for separate circuitry 206. The electroacoustic transmitter 208 may be, e.g., a piezo-electric transducer (or any other electrically driven device that generates sound or mechanical vibrations), and is driven with the electronic signal (output by the electronic circuitry 206 or directly by the sensor(s) 202, 204) so as to generate an acoustic signal encoding the measured parameter(s). The acoustic signal is transmitted through the pumping fluid in which the sensor device 116 is immersed and through the casing wall to the fiber cable 100. In some embodiments, the electronic circuitry 206 serves to control sensor and transmitter operation; for example, the sensor device 116 may be programmed, via instructions stored in memory of the electronic circuitry, to measure the downhole parameter(s) and transmit a signal encoding the downhole parameter(s) at a specified rate. As described above, the acoustic signal is imparted on an optical signal measured by the fiber-optic system, which can be decoded to ascertain the measured parameters as well as, based on the time of flight (or, in the case of quasi-distributed fiber-optic systems using point sensors such as FBGs, based on the known point sensor locations), the present location of the sensor device. The electronics module 200 may further include a battery 210 powering the sensors 202, 204, electronic circuitry 206, and/or electroacoustic transmitter 208. In principle, the sensor device 116 may also include energy-harvesting components. However, since, in the usual application scenarios, the sensor device 116 is used only for relatively short periods of time (e.g., days instead of months or years), a battery is generally sufficient. Beneficially, avoiding the need for energy harvesting from the borehole contributes to keeping the dimensions of the electronics module 200, and thus of the sensor device 116, small. In various embodiments, the electronics module 200 is implemented with high-temperature electronics to enable downhole sensing at temperatures up to 175° C. or even 200° C.; analog electronics is particularly suitable to achieve operability at such high temperatures. Furthermore, to allow the electronics to be deployed at the high pressures often encountered in boreholes, the electronics module may be enclosed in a pressure housing 212.

Figure 3:
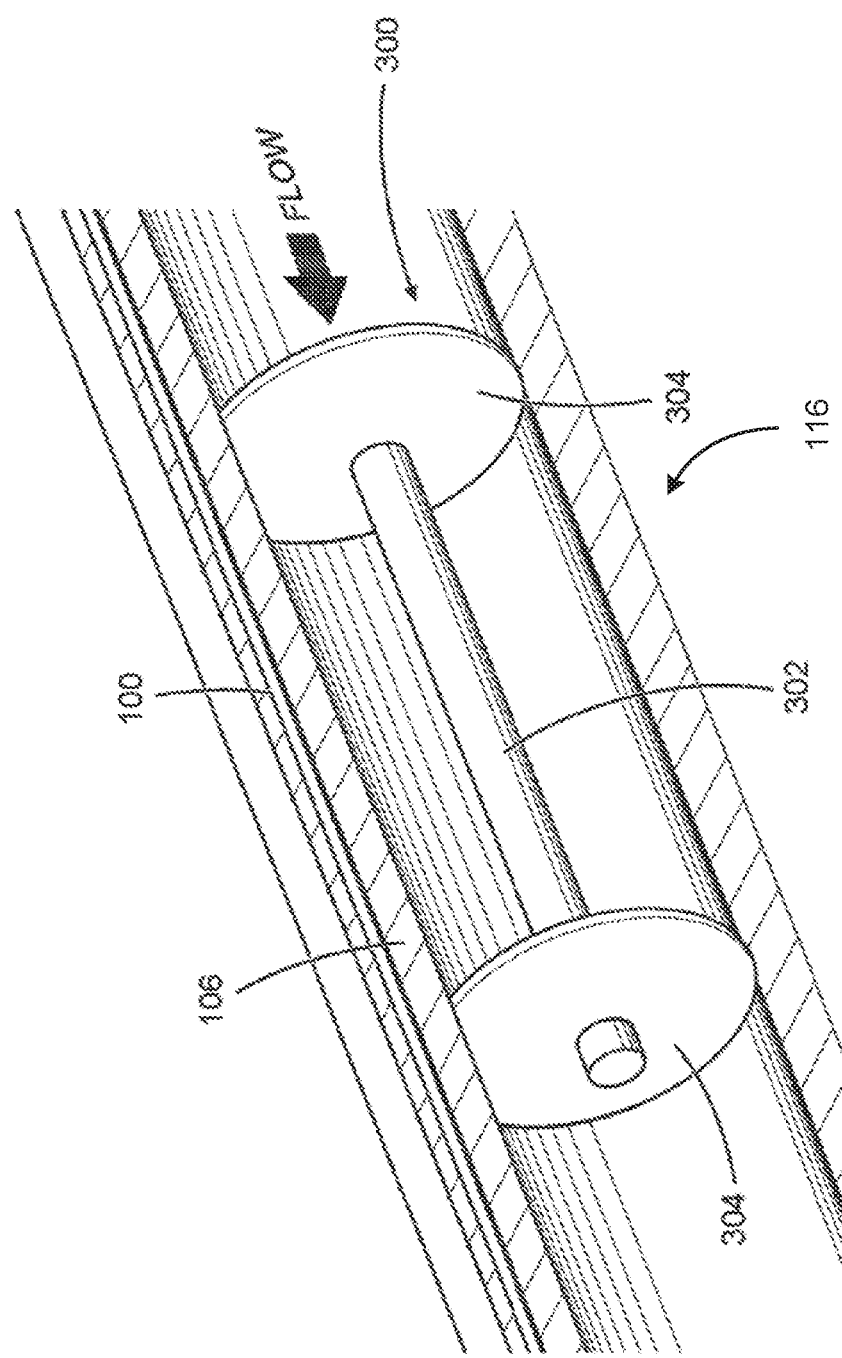
FIG. 3 is a cutaway view of a pump-down sensor device disposed in a borehole casing, illustrating an example sensor-device housing with flow baffles in accordance with various embodiments.

FIG. 3 shows an example housing 300 of a pump-down sensor device 116 disposed in a borehole casing 106 in a cutaway view. The housing 300 may be a pressure housing rated to withstand pressures up the highest pressure level to be expected at borehole depths where the device 116 is intended to be used. As shown, the housing 300 may include a central cylindrical body 302 and two flow baffles 304 disposed on opposite ends of the body 302. The electronics module 200 may be enclosed in the body 302, and/or partially in the body 302 and partially within the flow baffles. In various embodiments, multiple acoustic transmitters 208 may be located near the periphery of the body 302 (which may have a significantly larger diameter relative to the casing or tubing than depicted) or the flow baffles 304 to be close to the casing or tubing for easier detectability of the transmitted acoustic signal by the optical fiber(s). The body may be made of any of various metals commonly used in downhole application, such as, without limitation, SS316L, Inconel A825, or Inconel 718. The flow baffles 304 may be made of syntactic foam, a material routinely used for buoyancy on deep-sea submersibles, which can resist high pressures. Alternatively, the flow baffles 304 may be made of metal, and buoyant materials may be incorporated into other parts of the housing 300 to adjust the buoyancy of the device 116. The flow baffles 304 keep the sensor device 116 centralized in the borehole and provide a suitable surface area for the pumping fluid to push against. In some embodiments, the flow baffles 304 are disk-shaped, as shown, but other shapes (e.g., spherical, box-shaped, etc.) are also possible. The diameters of the flow baffles 304 may match the inner diameter of the casing 106, as shown; in this manner, the sensor device 116 is laterally stabilized and restricted to longitudinal movement within the casing 106. To allow a small amount of fluid flow past the sensor device 116 (e.g., to allow floating and sinking if desired), the flow baffles 304 may include perforations or deviate from radial symmetry to provide flow space between the periphery of the flow baffle 304 and the casing or tubing (not shown). Alternatively or additionally, the body 302 may be centrally hollowed out to form a small flow tube allowing fluid flow therethrough. In some embodiments, a flow sensor is placed in the hollowed-out space. The flow tube may also serve as a fluid sampler so that the chemical composition of fluids from different production intervals can be measured, as described in more detail below with respect to FIG. 4. While a sensor device 116 with two flow baffles 304 is shown in FIG. 3, in various alternative embodiments, the sensor device 116 may have only a single flow baffle 304 (e.g., placed about a center of the body 302), or three or more flow baffles 304, which may be of the same or of different sizes and shapes. Having baffles 304 at both ends of the sensor device 116 renders the device 116 more stable and helps navigating turns in the borehole.

In accordance with various embodiments, the flow baffles 304 are configured, via suitable material selection and properties and/or dimensions, for a desired degree of buoyancy of the sensor device 116 in a given pumping fluid (or, more precisely, pumping fluid of a given density). For example, if the flow baffles are made of syntactic foam, the density of the foam can be adjusted. In certain embodiments, the sensor device 116 is neutrally buoyant in a given pumping fluid, i.e., the upward force exerted on the sensor device 116 by the surrounding pumping fluid (the "buoyancy" of the device) matches the weight of the sensor device 116, such that the device 116 tends to remain stationary (neither sink nor float) in the pumping fluid. Neutral buoyancy can be achieved via careful calibration, e.g., by precisely adjusting the dimensions of the flow baffles 304 such that the weight of the pumping fluid displaced by the sensor device 116 in its entirety (which depends on the total device volume) equals the sensor-device weight. Beneficially, a neutrally buoyant sensor device 116 affords a high level of control over the sensor location within the borehole, since it can be pumped down to a desired location and remains there when pumping ceases. However, non-neutrally buoyant sensor devices 116 may also have applications. For example, sensor devices whose buoyancy is less than their weight (i.e., "negatively buoyant" sensor devices 116) may be used if the device is to stay at the bottom, and sensor devices 116 whose buoyancy exceeds their weight (i.e., "positively buoyant" sensor devices 116) may be used to have the sensor device 116 move back up to the top of the borehole once pumping stops. In all of these cases, the buoyancy of the device 116 is managed.

Figure 4:
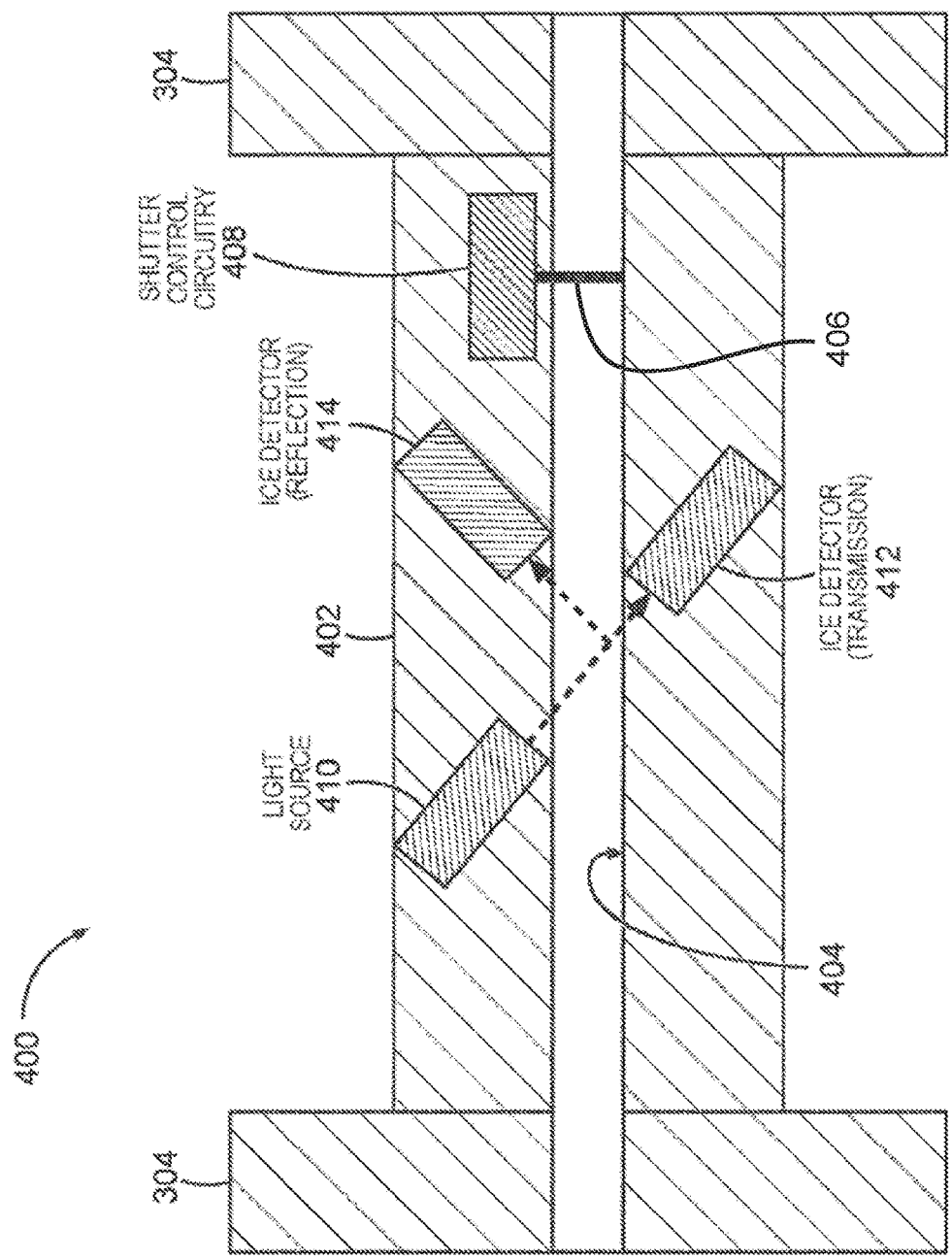
FIG. 4 is a cross-sectional view of a pump-down sensor device with integrated fluid sampler, in accordance with various embodiments.

FIG. 4 is a cross-sectional view of an example pump-down sensor device 400 with integrated fluid sampler, in accordance with various embodiments. The body 402 of the sensor device 400 forms a flow tube 404 through which fluid can pass. Fluid flow through the tube 404 can be closed off with a valve or shutter 406, which may be programmed, via suitable control circuitry 408 embedded in the body 402, to open and close periodically. Optical components integrated into the device 400 may be used, when the shutter 406 is open and fluid is allowed to pass through the tube 404, to analyze the chemical composition of the fluid. In one embodiment, Integrated Computational Element (ICE) Core™ technology (as provided by Halliburton Company, headquartered in Houston, Tex.), which is well-known to those of ordinary skill in the art, is used. In brief, a laser light source 410 shines light through the fluid. Two ICE Core detectors 412, 414 on opposite sides of the flow tube 404 detect light that is transmitted through or scattered by the fluid, respectively. Each of the detectors 412, 414 includes a plurality of sensors each being configured to recognize a specific chemical component (e.g., methane, ethane, propane, aromatics, saturates, water, etc.) in the fluid based on its "optical fingerprint." The individual sensors, thus, respond selectively to different fluid components, allowing the composition of the fluid to be determined in real time. In an alternative embodiment, Raman spectroscopy, which is likewise well-known to those of ordinary skill in the art, is used instead of ICE Core technology. In Raman spectroscopy, a laser light source shines light through the sample, and one or more Raman spectroscopy sensors are used in transmission and/or reflection mode to detect vibrational, rotational, or other low-frequency modes of the fluid components interacting with the light, based on which the chemical nature of these components can be identified. In both embodiments, data about the determined chemical composition of the fluid may be communicated to the surface using the electroacoustic transmitter 208 and fiber-optic system.

In some embodiments, the sensor device 116 is asymmetric, in its weight distribution, about its longitudinal axis such that it has a lower portion with a higher density and an upper portion with a lower density when oriented horizontally. This will give the device 116 a known orientation in a horizontal borehole section, which is beneficial if the device 116 includes sensors that are intended to measure a signal in a specified direction (e.g., geophones or other seismic or vibration sensors to be aligned with a vertical or a given horizontal direction). If the device 116 is, moreover, negatively buoyant, it will sink to the bottom of the horizontal borehole section, and its weight will provide for good mechanical coupling between the device 116 and the casing, which is advantageous for the detection of seismic waves. Flow through the borehole may be shut off during the measurements to keep the seismic sensors stationary, which provides low-noise conditions for data collection if used with, e.g., a surface seismic source, and also provides a quiet environment for data transmission. The baffle(s) in the lower portion of the device 116 may, in addition, be shaped to keep the device 116 from rolling, e.g., akin to a twin keel on a boat.

Although it is contemplated herein that the sensor device 116 is returned to the surface when desired, it is possible that a device 116 becomes stuck in the casing. In this situation, standard fishing techniques may be employed to dislodge and retrieve the sensor device 116. Alternatively, to avoid fishing, the flow baffle(s) 304 may be constructed, in whole or in part, from a material that dissolved over time when submersed in downhole fluids and/or exposed to downhole temperatures, thereby freeing itself after a known period of time. Similarly, the sensor device 116 itself may be made with materials or include features that largely dissolve if the device 116 is left downhole; this may be beneficial for negatively buoyant sensor devices 116.

Figure 5:
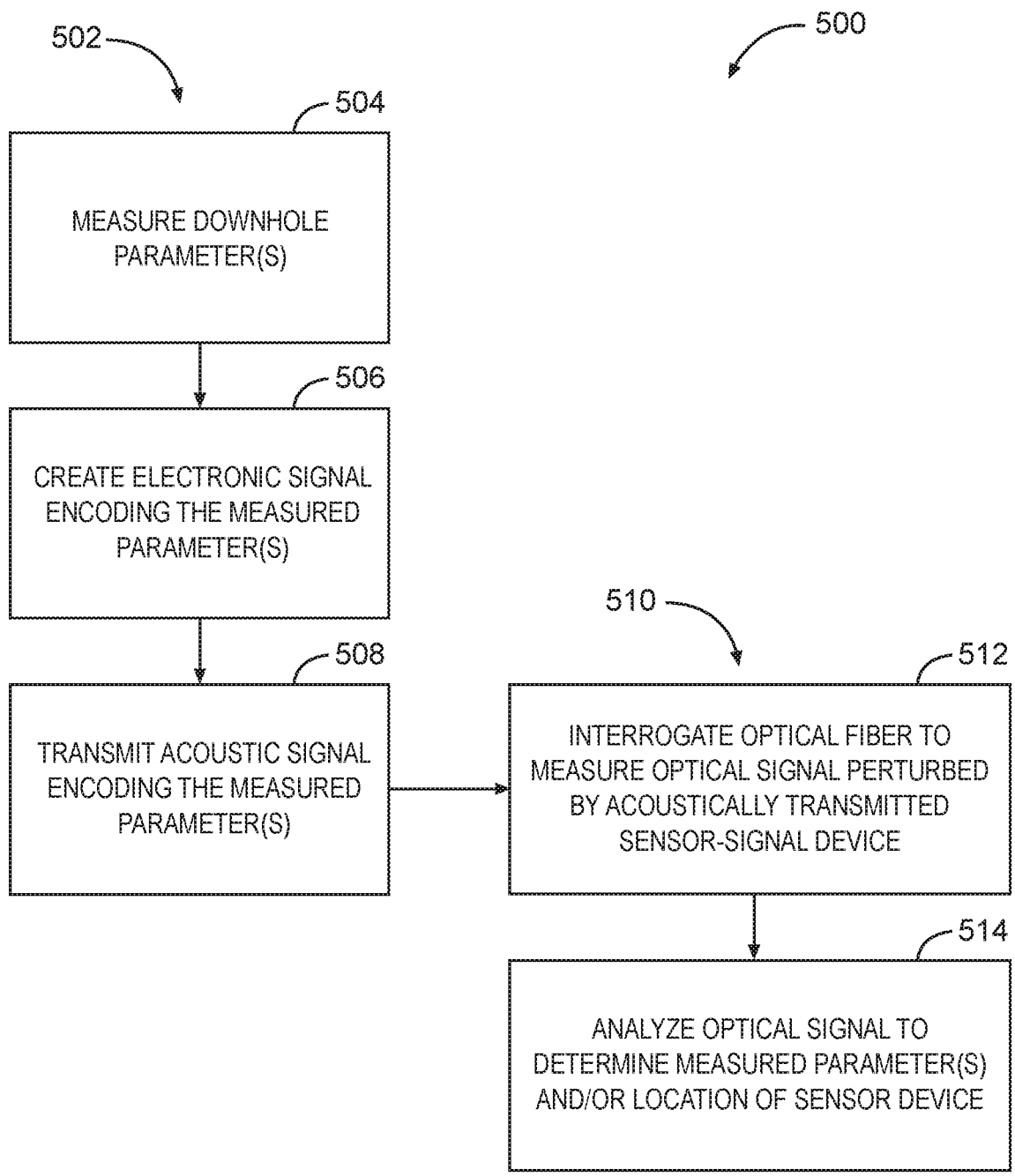
FIG. 5 is a flow chart of an example method of operation of a pump-down sensor device and fiber-optic sensing system in accordance with various embodiments.

FIG. 5 is a flow chart of an example method of operation of a pump-down sensor device and fiber-optic sensing system in accordance with various embodiments. The method 500 involves, in a prong 502 of operations performed by the pump-down sensor device 116, measuring one or more downhole parameter(s) (operation 504), creating an electronic signal encoding the measured parameter(s) (operation 506), and transmitting an acoustic signal encoding the measured parameter(s) (e.g., by driving an electroacoustic transmitter in accordance with the electronic signal) (operation 508). Further, in a prong 510 of operations performed by the interrogation unit 108 of the fiber-optic sensing system, the method 500 includes interrogating the optical fiber(s) to measure an optical signal perturbed by the acoustically transmitted signal from the sensor device (operation 512) and analyzing the optical signal to determine the measured parameter(s) and/or the current location of the sensor device (operation 514).

Figure 6:
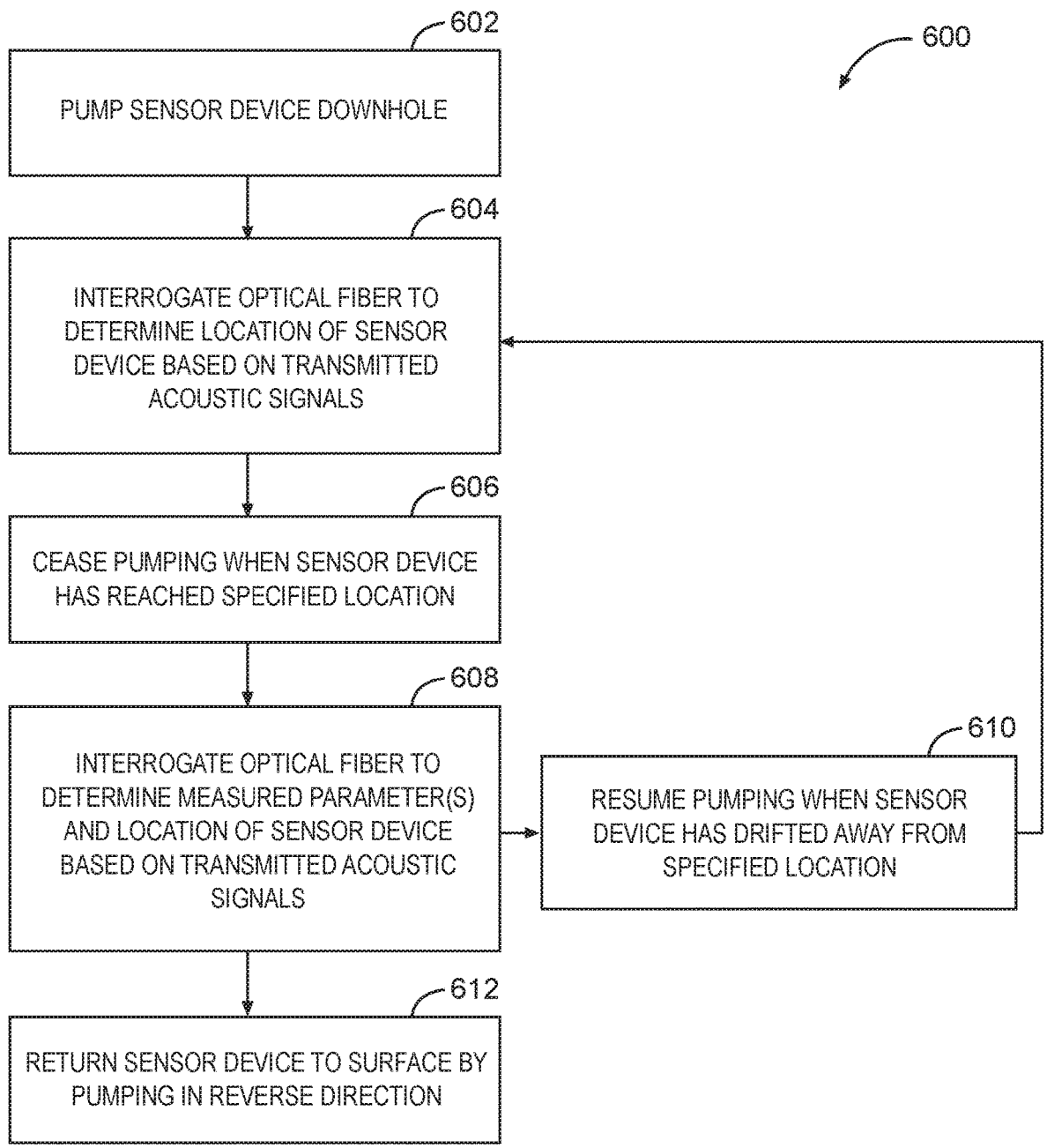
FIG. 6 is a flow chart of an example method of using a neutrally buoyant pump-down sensor device in accordance with various embodiments.

FIG. 6 is a flow chart of an example method of using a neutrally buoyant pump-down sensor device and fiber-optic sensing system in accordance with various embodiments. The method 600 involves pumping the sensor device 116 downhole (action 602). In order to position the sensor device at a desired depth within the borehole (which may be the bottom of the borehole, or any depth between the surface and the bottom), the optical fiber may be interrogated continuously or repeatedly at brief intervals during the pumping to determine the momentary location of the sensor device based on acoustic signals it emits (action 604), and pumping may be stopped once sensor device has reached the target depth (e.g., as shown on a display device of the DAS system) (act 606). Interrogating the fiber and analyzing the optical signal thereafter (in act 608) serves to determine the measured parameter(s) at the target depth, as well as to confirm that the device is still at the desired location. If a drift in depth occurs due to a slight deviation from perfect neutral buoyancy (i.e., a slight mismatch between the average density of the sensor device 116 and the pumping fluid), the device can be repositioned resuming pumping (in either direction, as needed) until the target depth is regained (act 610). When downhole measurements are complete, the sensor device can be returned to the surface by pumping in the opposite direction (act 612). For example, the device may be returned to the surface during flowback or production so that it is not a hindrance in the borehole. Once the sensor device has been retrieved, a fresh battery may be installed for re-use.

Pump-down sensor devices 116 as described herein may find application across a wide range of borehole operations. For example, a sensor device 116 equipped with a pressure sensor may be pumped into the borehole prior to or during fracture treatment so that the borehole pressure can be monitored in real time. In this case, the sensor device 116 is, for each treatment stage, pumped all the way to the bottom of the treatment interval to record the true bottom-hole pressure during and after pumping for control and analysis. The energy requirements of the sensor device 116 are limited because of the relatively short total measurement time of, usually, only a few or several hours. Such a pressure-sensing system may also be used, e.g., for re-fracturing and production monitoring. As another example, a plurality of sensor devices 116 with seismic sensors may be pumped to specific respective depths to form a sensor array for seismic measurements. As will be readily appreciated, the particular application may dictate whether a neutrally buoyant, positively buoyant, or negatively buoyant sensor device is used, and whether the device is returned to the surface or not. For example, neutrally buoyant sensor devices that move with the fluid flow may be preferred for measurements of the bulk flow velocity. Negatively buoyant sensor devices are useful for seismic sensing in horizontal borehole sections (as described above), or to measure the temperature and/or pressure at the bottom of the well, in the toe or rat hole. Positively buoyant devices can be used, e.g., to measure the fluid density in the borehole at fluid interface between water and oil or between oil and gas.

The following numbered examples are illustrative embodiments:

1. A method comprising: pumping a sensor device along with a pumping fluid down a pipe disposed inside a borehole, the sensor device being configured to measure at least one downhole parameter and transmit an acoustic signal encoding the at least one measured downhole parameter to an optical fiber disposed in an annular space around the pipe; interrogating the optical fiber to measure an optical signal perturbed by the acoustic signal; and analyzing the optical signal to determine therefrom the measured parameter and a location of the sensor device.

2. The method of example 1, further comprising ceasing the pumping when the sensor device has reached a specified location within the borehole.

3. The method of example 2, further comprising resuming pumping when the sensor device has drifted away from the specified location.

4. The method of any preceding example, wherein the sensor device comprises a housing including one or more baffles configured, based on the pumping fluid, for a specified buoyancy of the sensor device relative to a weight of the sensor device.

5. The method of example 4, wherein the one or more baffles are calibrated for a substantially neutral buoyancy of the sensor device, the method further comprising returning the sensor device to surface by reversing a direction of pumping.

6. The method of example 4, wherein the one or more baffles are positively buoyant, the method further comprising passively returning the device to surface by ceasing pumping.

7. The method of any preceding example, wherein a weight distribution of the sensor device is asymmetric about a longitudinal device of the sensor device, the sensor device being pumped into a horizontal section of the borehole.

8. The method of any preceding example, comprising pumping a plurality of sensor devices downhole at specified spacings.

9. The method of any preceding example, wherein a coherent-Rayleigh-based sensing technique or a Fiber-Bragg-Grating-based Fabry-Perot sensing technique is used to interrogate the optical fiber and analyzing the optical signal.

10. A pump-down sensor device for transport via a pumping fluid, the device comprising: a housing comprising one or more flow baffles configured, based on the pumping fluid, for a specified buoyancy of the sensor device relative to a weight of the sensor device; and, contained within the housing, an electronics module comprising at least one sensor to measure at least one parameter and, communicatively coupled with the at least one sensor, at least one electroacoustic transmitter to transmit an acoustic signal encoding the at least one measured parameter.

11. The sensor device of example 10, wherein the one or more flow baffles are made from syntactic foam.

12. The sensor device of example 10 or example 11, wherein the one or more baffles are calibrated for substantially neutral buoyancy of the sensor device.

13. The sensor device of any of examples 10-12, wherein the housing comprises two baffles disposed on opposite ends of the sensor device.

14. The sensor device of any of examples 10-13, wherein the flow baffles are at least partially dissolvable downhole.

15. The sensor device of any of examples 10-14, wherein the at least one electroacoustic transmitter comprises a piezoelectric transmitter.

16. The sensor device of any of examples 10-15, wherein the electronics module further comprises a battery and circuitry for encoding the at least one measured parameter in an electronic signal and driving the electroacoustic transmitter in accordance with the electronic signal.

17. The sensor device of any of examples 10-16, wherein the housing is a pressure housing and the electronics module is high-temperature electronics.

18. The sensor device of any of examples 10-17, wherein a weight distribution of the sensor device is asymmetric about a longitudinal axis of the sensor device.

19. The sensor device of any of example 10-18, wherein the housing defines a flow tube for fluid flow therethrough.

20. The sensor device of example 19, further comprising a shutter in the flow tube to periodically close a fluid path through the flow tube.

21. The sensor device of example 19, further comprising, disposed about the flow tube, a light source and at least one detector configured to analyze a composition of fluid flowing through the flow tube.

22. The sensor device of claim 21, wherein the at least one detector comprises an Integrated Computational Element Core detector or a Raman spectroscopy sensor.

23. A system comprising: a pump-down sensor device for transport via a pumping fluid, the device comprising: a housing comprising one or more flow baffles configured, based on the pumping fluid, for a specified buoyancy of the sensor device relative to a weight of the sensor device, and, contained within the housing, an electronics module comprising at least one sensor to measure at least one downhole parameter and, communicatively coupled with the at least one sensor, a transmitter to transmit a signal encoding the at least one measured parameter to an optical fiber disposed in an annular space surrounding tubing containing the borehole fluid; and a fiber-optic sensing system comprising the optical fiber, and an interrogation unit to measure an optical signal perturbed by the transmitted signal and to determine the at least one measured parameter and a location of the sensor device based on the optical signal.

24. The system of example 23, wherein the transmitter is an electroacoustic transmitter.

25. The system of example 23 or example 24, wherein the pump-down sensor is programmed to measure the at least one downhole parameter and transmit a signal encoding the at least one downhole parameter at a specified rate.

26. The system of any of examples 23-25, wherein the pump-down sensor device and the interrogation unit are collectively configured to determine the at least one measured parameter in real-time.

27. The system of any of examples 23-26, wherein the fiber-optic sensing system is a distributed acoustic sensing system.

28. The system of example 27, wherein the fiber-optic sensing system is a coherent-Rayleigh-based sensing system.

29. The system of any of examples 23-26, wherein the fiber-optic sensing system is a quasi-distributed Fiber-Bragg-Grating-based Fabry-Perot sensing system.

30. The system of any of examples 23-29, wherein the one or more baffles match an inner diameter of the tubing.

Many variations may be made in the devices, systems, and methods described and illustrated herein without departing from the scope of the inventive subject matter. Accordingly, the described embodiments are not intended to limit the scope of the inventive subject matter. Rather, the scope of the inventive subject matter is to be determined by the scope of the following claims and all additional claims supported by the present disclosure, and all equivalents of such claims.

What is claimed is:
1. A method comprising:
pumping a sensor device along with a pumping fluid down a pipe disposed inside a borehole, the sensor device comprising a housing comprising one or more flow baffles at least partially dissolvable being config- ured to measure at least one downhole parameter and transmit an acoustic signal encoding the at least one measured downhole parameter to an optical fiber disposed in an annular space around the pipe;

interrogating the optical fiber to measure an optical signal perturbed by the acoustic signal; and analyzing the optical signal to determine therefrom the measured parameter and a location of the sensor device.

2. The method of claim 1, further comprising ceasing the pumping when the sensor device has reached a specified location within the borehole, and resuming pumping when the sensor device has drifted away from the specified location.

3. The method of claim 1, wherein the one or more baffles are configured for a specified buoyancy of the sensor device that comprises neutral buoyancy whereby the sensor device returns to the surface when the pumping is reversed, or the specified buoyancy comprises positive buoyancy whereby the sensor device passively returns the device to surface when pumping ceases.

4. The method of claim 1, comprising pumping a plurality of sensor devices downhole at specified spacings.

5. The method of claim 1, wherein a coherent-Rayleigh-based sensing technique or a Fiber-Bragg-Grating-based Fabry-Perot sensing technique is used to interrogate the optical fiber and analyzing the optical signal.

6. A pump-down sensor device for transport via a pumping fluid, the device comprising:
a housing comprising one or more flow baffles at least partially dissolvable downhole and configured for a specified buoyancy of the sensor device; and
contained within the housing, an electronics module comprising at least one sensor to measure at least one parameter and, communicatively coupled with the at least one sensor, at least one electroacoustic transmitter to transmit an acoustic signal encoding the at least one measured parameter.

7. The sensor device of claim 6, wherein the one or more flow baffles are made from syntactic foam.

8. The sensor device of claim 6, wherein the housing comprises two baffles disposed on opposite ends of the sensor device.

9. The sensor device of claim 6, wherein the at least one electroacoustic transmitter comprises a piezoelectric transmitter.

10. The sensor device of claim 6, wherein the electronics module further comprises a battery and circuitry for encoding the at least one measured parameter in an electronic signal and driving the electroacoustic transmitter in accordance with the electronic signal.

11. The sensor device of claim 6, wherein the housing is a pressure housing and the electronics module is high-temperature electronics.

12. The sensor device of claim 6, wherein a weight distribution of the sensor device is asymmetric about a longitudinal axis of the sensor device.

13. The sensor device of claim 6, wherein the housing defines a flow tube for fluid flow therethrough, a shutter in the flow tube to periodically close a fluid path through the flow tube, and a light source and at least one detector configured to analyze a composition of fluid flowing through the flow tube.

14. The sensor device of claim 13, wherein the at least one detector comprises an Integrated Computational Element Core detector or a Raman spectroscopy sensor.

15. A system comprising:
a pump-down sensor device for transport via a pumping fluid, the device comprising:
a housing comprising one or more flow baffles at least partially dissolvable downhole configured for a specified buoyancy of the sensor device; and
contained within the housing, an electronics module comprising at least one sensor to measure at least one downhole parameter and, communicatively coupled with the at least one sensor, a transmitter to transmit a signal encoding the at least one measured parameter to an optical fiber disposed in an annular space surrounding tubing containing the borehole fluid; and
a fiber-optic sensing system comprising:
the optical fiber; and
an interrogation unit to measure an optical signal perturbed by the transmitted signal and to determine the at least one measured parameter and a location of the sensor device based on the optical signal.

16. The system of claim 15, wherein the transmitter is an electroacoustic transmitter.

17. The system of claim 15, wherein the pump-down sensor is programmed to measure the at least one downhole parameter and transmit a signal encoding the at least one downhole parameter at a specified rate.

18. The system of claim 15, wherein the pump-down sensor device and the interrogation unit are collectively configured to determine the at least one measured parameter in real-time.

19. The system of claim 15, wherein the fiber-optic sensing system is a distributed acoustic sensing system.

20. The system of claim 19, wherein the fiber-optic sensing system is a coherent-Rayleigh-based sensing system.

21. The system of claim 15, wherein the fiber-optic sensing system is a quasi-distributed Fiber-Bragg-Grating-based Fabry-Perot sensing system.

22. The system of claim 15, wherein the one or more baffles match an inner diameter of the tubing.

* * * * *

UNITED STATES PATENT AND TRADEMARK OFFICE
CERTIFICATE OF CORRECTION

PATENT NO. : 10,711,599 B2
APPLICATION NO. : 15/775807
DATED : July 14, 2020
INVENTOR(S) : Mikko Jaaskelainen et al.

Page 1 of 1

It is certified that error appears in the above-identified patent and that said Letters Patent is hereby corrected as shown below:

In the Claims

Column 10 Lines 65-Column 11 Line 1 In Claim No. 1, "the sensor device comprising a housing comprising one or more flow baffles at least partially dissolvable being configured" should read -- "the sensor device comprising a housing comprising one or more flow baffles at least partially dissolvable downhole, the sensor device being configured" --.

Signed and Sealed this
First Day of September, 2020

Andrei Iancu
*Director of the United States Patent and Trademark Office*